(12) United States Patent
Georgiades et al.

(10) Patent No.: US 8,582,761 B2
(45) Date of Patent: Nov. 12, 2013

(54) CRYPTOGRAPHIC METHOD WITH ELLIPTICAL CURVES

(75) Inventors: Jean Georgiades, München (DE); Anton Kargl, München (DE); Bernd Meyer, München (DE)

(73) Assignee: Siemens Aktiengesellschaft, Munich (DE)

(*) Notice: Subject to any disclaimer, the term of this patent is extended or adjusted under 35 U.S.C. 154(b) by 666 days.

(21) Appl. No.: 12/225,480

(22) PCT Filed: Mar. 6, 2007

(86) PCT No.: PCT/EP2007/052075
§ 371 (c)(1),
(2), (4) Date: Sep. 23, 2008

(87) PCT Pub. No.: WO2007/107450
PCT Pub. Date: Sep. 27, 2007

(65) Prior Publication Data
US 2009/0285388 A1    Nov. 19, 2009

(30) Foreign Application Priority Data
Mar. 23, 2006  (DE) .......................... 10 2006 013 515

(51) Int. Cl.
*G06F 7/04*    (2006.01)
*H04K 1/00*    (2006.01)
*H04L 9/32*    (2006.01)

(52) U.S. Cl.
USPC ............... 380/30; 380/34; 380/259; 380/277; 380/278; 380/279; 380/282; 380/283; 380/285; 380/28; 713/171; 713/182; 713/189; 713/193; 713/194; 726/26

(58) Field of Classification Search
USPC ................................ 380/30; 726/26; 713/171
See application file for complete search history.

(56) References Cited

U.S. PATENT DOCUMENTS 5,272,755 A * 12/1993 Miyaji et al. .................... 380/30
6,330,332 B1    12/2001 Itoh et al.
(Continued)

FOREIGN PATENT DOCUMENTS

DE    10161138 A1    7/2003
DE    10161137 A1    10/2003
(Continued)

OTHER PUBLICATIONS

Baier et al, Generation Methods of Elliptic Curves, Aug. 27, 2002, http://www.ipa.go.jp/security/enc/CRYPTEC/fy15/doc/1030_Buchmann.evaluation.pdf.*

(Continued)

*Primary Examiner* — Christopher Brown
*Assistant Examiner* — Jenise Jackson
(74) *Attorney, Agent, or Firm* — Staas & Halsey LLP

(57) ABSTRACT

A method determines an elliptical curve, suitable for a cryptographic method. An elliptical curve to be tested is prepared. The order of a twisted elliptical curve associated with the elliptical curve to be tested is determined. It is automatically checked whether the order of the twisted elliptical curve is a strong prime number. If the order of the twisted elliptical curve is a strong prime number, the elliptical curve to be tested is selected as an elliptical curve suitable for cryptographical methods.

20 Claims, 3 Drawing Sheets

(56) References Cited

U.S. PATENT DOCUMENTS

| | | | |
|---|---|---|---|
| 6,738,478 B1* | 5/2004 | Vanstone et al. | 380/28 |
| 6,829,356 B1 | 12/2004 | Ford | |
| 7,162,033 B1* | 1/2007 | Coron | 380/30 |
| 7,286,666 B1* | 10/2007 | Coron | 380/30 |
| 7,864,951 B2* | 1/2011 | Al-Gahtani et al. | 380/28 |
| 2002/0073311 A1* | 6/2002 | Futamura et al. | 713/157 |
| 2004/0250081 A1* | 12/2004 | Crandall | 713/176 |
| 2004/0264692 A1* | 12/2004 | Garay et al. | 380/28 |
| 2006/0153369 A1* | 7/2006 | Beeson | 380/30 |
| 2006/0153370 A1* | 7/2006 | Beeson | 380/30 |
| 2006/0153371 A1* | 7/2006 | Beeson | 380/30 |
| 2006/0156012 A1* | 7/2006 | Beeson | 713/180 |
| 2006/0156013 A1* | 7/2006 | Beeson | 713/180 |
| 2007/0071237 A1* | 3/2007 | Brown et al. | 380/30 |
| 2007/0121933 A1* | 5/2007 | Futa et al. | 380/1 |
| 2007/0189527 A1* | 8/2007 | Brown et al. | 380/44 |
| 2008/0019509 A1* | 1/2008 | Al-Gahtani et al. | 380/30 |
| 2010/0106970 A1* | 4/2010 | Brown et al. | 713/168 |

FOREIGN PATENT DOCUMENTS

| | | |
|---|---|---|
| JP | 11-52853 | 2/1999 |
| JP | 11-234259 | 6/1999 |
| JP | 2003-255831 | 9/2003 |
| JP | 2005-321719 | 11/2005 |

OTHER PUBLICATIONS

Fouguet et al, 2001, Eurocrypt, Finding Secure Curves, pp. 1-29.*
Li et al, Quantitative Evaluation of Side-Channel Security for Elliptic Curve Cryptosystems, pp. 1-4.*
Gadiel Seroussi; "Elliptic curve cryptography" in Information Theory and Networking Workshop, IEEE, Metsovo, Greece, Jun. 27-Jul. 1, 1999.
Chaum D. et. al., International Association for Cryptologic Research: "Cryptographically Strong Undeniable Signatures, Unconditionally Secure for the Signer", Advances in Cryptology, Santa Barbara, Aug. 11-15, 1991, Proceedings of the Conference on Theory and Applications of Cryptographic Techniques (CRYPTO), Berlin, Springer, DE, Apr. 16, 1992, pp. 470-484.
Daniel R. L. Brown und Robert P. Gallant, "The Static Diffie-Hellman Problem", Jun. 23, 2005, (Internet: http://www.cacr.math.uwaterloo.ca/conferences/2005/ecc2005/gallant.pdf.
Katsuyuki Okeya et al., "A Hybrid Hardware Attack Surpasses Side Channel and Fault Attacks", IEICE Technical Report, Mar. 12, 2002, vol. 101, No. 732, 7 pages.
German language Japanese Office Action for related Japanese Patent Application No. 2009-501996, mailed on Jun. 9, 2011.
Horiuchi, Keiji, at al., "Notes on Finding Elliptic Curve with Prime Order and the Amount of Calculation", Institute of Electronics, Information and Communication Engineers, vol. 98, Nr. 228, pp. 31-36, Jul. 31, 1998.

* cited by examiner

CRYPTOGRAPHIC METHOD WITH ELLIPTICAL CURVES

CROSS REFERENCE TO RELATED APPLICATIONS

This application is based on and hereby claims priority to German Application No. 10 2006 013 515.6 filed on Mar. 23, 2006 and PCT Application No. PCT/EP2007/052075 filed on Mar. 6, 2007, the contents of which are hereby incorporated by reference.

BACKGROUND OF THE INVENTION

The present invention relates to a method for determining elliptical curves, in particular elliptical curves which are suitable for cryptographic data processing. Further, a cryptographic method and a facility are based on the elliptical curves previously selected.

Cryptographic methods are used, among other purposes, for encrypting messages, signing documents and authenticating individuals or objects. Particularly suitable for this purpose are so-called asymmetric encryption methods, in which a participant is provided with both a private key, which is kept secret, and also a public key.

When encrypting a message, the sender makes use of the desired addressee's public key, and uses it to encrypt the message. Thereafter, only the addressee is in a position to decrypt the message again, using the private key known only to him.

When signing a document, the signatory uses his private key to calculate from the document an electronic signature. Other people can directly verify the signature, using the signatory's public key. However, only signatures which were produced using the associated private key can be verified using the public key. As a result of this unique assignment, and assuming that the private key is kept secret by the signatory, there is a unique assignment of the signature to the signatory and to the document.

In the case of authentication using a challenge-response protocol, a testing station communicates a request to a person asking them to calculate and send back a reply, using their private key. A positive authentication results if the testing station is able, using the public key of the individual to be checked, to verify the reply which is sent back.

As explained above, asymmetric cryptographic methods are based on a private and a public key. Here, the public key is generated from the private key by a predefined algorithm. What is important for cryptographic methods is that the reverse, that is the determination of the private key from the public key, should not be manageable within a finite time with the computing capacities which are available. This is the case if the key length of the private key is greater than a minimum length. This minimum length for the key depends on the algorithms used for the encryption and on the determination of the public key.

The operations using the public or private key call for a certain amount of computational effort. This depends on the algorithms used and also on the length of the keys used. In this situation it has proved advantageous to use encryption algorithms based on elliptical curves, because these provide high security with short key lengths. In the case of cryptographic methods based on elliptical curves there is, unlike other methods, as yet no known way of determining the private key from the public key for which the computational effort increases more slowly than exponentially as the key length increases. In other words, the security gain per additional bit of length for the key which is used is higher than for other methods. Hence significantly shorter key lengths can be used for practical applications.

An elliptical curve E is generally defined by a Weierstraß equation, which is written as the following cubic equation:

$$y^2 + a_1 xy + a_3 y = x^3 + a_2 x^2 + a_4 x + a_5$$

In this, $a_1$ $a_2$ $a_3$ $a_s$ $a_s$ are constant chosen elements of a field K and the pairs (x, y) are points on the elliptical curve E and satisfy the Weierstraß equation. For the cryptographic methods, a finite field K is selected. Accordingly, the number of points on the elliptical curve E is also finite, and is referred to below as the order ord(E) of the curve E. In addition, one formal point is introduced at infinity.

An abelian group structure G can be defined on the set of points on the elliptical curve. The operation of the abelian group structure is referred to below as addition, and is written additively. The addition of two arbitrary points on the elliptical curve gives a unique third point on this elliptical curve. Furthermore, it is possible in this way to define a scalar multiplication, which is defined as the multiple addition of a point to itself. Let P be a point on the elliptical curve E, s an integer and Q=sP the s-fold of the point P. Q is also a point on the elliptical curve. The determination of the scalar s for given points P and Q is referred to as the discrete logarithm problem for elliptical curves. For a suitable choice of the field K and the parameters of the elliptical curve E it is impossible to solve the discrete logarithm problem in a reasonable time with the computing facilities presently available. The security of cryptographic methods using elliptical curves rests on this difficulty.

The communication participant selects a scalar s as his private key, and keeps it secret. In addition, from a start point P he generates the public key Q as the scalar multiple of the start point. In respect of the start point P, there is agreement between the communication participants. Owing to the high computational cost of the discrete logarithm problem, it is not possible to determine the private key s from the public key Q, which is what gives cryptographic methods using elliptical curves their security. Another requirement to be met by the elliptical curves is that their order should be a large prime number or the product of a large prime number and a small number.

Cryptographic methods represent a compromise between an expected level of security and the computational cost for encrypting data. It is shown in DE 101 61 138 A1 that it is possible to determine the scalar multiple of a point solely by reference to the x-coordinates, without involving the y-coordinates. Appropriate computational rules are described for arbitrary fields in DE 101 61 138 A1. These permit significantly more efficient implementations of the point arithmetic to be achieved, e.g. a Montgomery ladder for the scalar multiplication, a smaller number of field multiplications per point addition and a smaller number of registers for the point representation and the intermediate results. However, with this method no check is made as to whether a point really is an element on the elliptical curve.

This produces the possibility of carrying out a side-channel attack. This involves communicating to an encryption facility an x-coordinate for a point which does not lie on the elliptical curve. In this connection, DE 10161138 A1 describes the fact that it is possible by this means to effect a partial reconstruction of the encryption facility's private key. To prevent such a side-channel attack, DE 10161138 A1 uses specially selected elliptical curves. In doing so, the twisted elliptical curves associated with the elliptical curves were used as the criterion. The associated twisted elliptical curve is defined as follows:

$$y^2 + va_1xy + a_3y = = x^3 + va_2x^2 + v^2a_4xv^3a_5,$$

where the parameters $a_1, a_2, a_3, a_4, a_6$ are the parameters of the elliptical curves. The parameters v are all non-squares of the field K, if the characteristic of the field K is odd, or an element of the field K with trace 1. In accordance with DE 10161138 A1, all these twisted elliptical curves should also have an order which is a large prime number or the product of a large prime number with a small number.

In their article "The Static Diffie-Hellman Problem", the authors Daniel R. L. Brown and Robert P. Gallant describe another possibility for a side-channel attack to spy out, completely or in part, a private key.

Against this background, one potential object is to provide a method which selects elliptical curves which, when subject to a side-channel attack, do not enable any conclusions to be drawn about the private key.

Accordingly, the following is provided:
A method for determining an elliptical curve which is suitable for cryptographic methods, with the following steps:
(a) provide an elliptical curve to be tested;
(b) determine the order of a twisted elliptical curve which is assigned to the elliptical curve to be tested;
(c) automatically check whether the order of the twisted elliptical curve is a strong prime number; and
(d) if the order of the twisted elliptical curve is a strong prime number, select the elliptical curve to be tested as an elliptical curve which is suitable for cryptographic method.

A method of processing data cryptographically with the following steps:
provide an elliptical curve, determined using the proposed method;
provide just one x-coordinate of a point;
provide a private key;
automatically apply a cryptographic encryption method to the x-coordinate, using the elliptical curve provided and the private key, to determine an encrypted x-coordinate; and
output a value based on the encrypted x-coordinate.

A facility for confirming the identify of a person or an object, having
   a receiving device which is used for receiving a coordinate,
   a storage device which keeps ready a private key for the person or the object,
   a processing device which is used to process the coordinate which has been received, using the private key, where the processing is based on an elliptical curve which is selected in accordance with one of the methods 1 to 3, and
   an output device which is set up to output the processed coordinate.

The proposed method uses an elliptical curve for the cryptographic method only if the twisted elliptical curve for this elliptical curve has an order which is a strong prime number. A strong prime number P is defined by the following equation:

$$P = 1 + r \cdot q,$$

where r is a small number, typically in the range up to 255, and q is a large prime number. Ideally, the strong prime number will be a so-called Sophie-Germain prime number, i.e. r is 2. The elliptical curves and the associated twisted elliptical curves conform to the definitions cited above. The proposed method prevents side-channel attacks which are based on x-coordinates which are communicated erroneously or on x-coordinates which are falsely communicated with malicious intent, where these x-coordinates do not correspond to any point on the selected elliptical curve. The proposed method is robust in the sense that even in the case of such x-coordinates it is not possible for an external device to spy out or partially determine the private key.

In accordance with one form of embodiment, the order of the twisted elliptical curve is determined by counting a number of points which lie on the twisted elliptical curve. Alternatively, the order of the twisted elliptical curve can also be determined on the basis of a determination of the order of the elliptical curve and the characteristic of the field. For this purpose, unique mathematical relationships between the different orders can be used. The counting of the points is effected using methods generally known to the specialist.

In one form of embodiment, an automatic check is made as to whether the order of the elliptical curve to be tested is a strong prime number, and the elliptical curve to be tested is then only selected for cryptographic methods if the order of the elliptical curve to be tested is a strong prime number.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
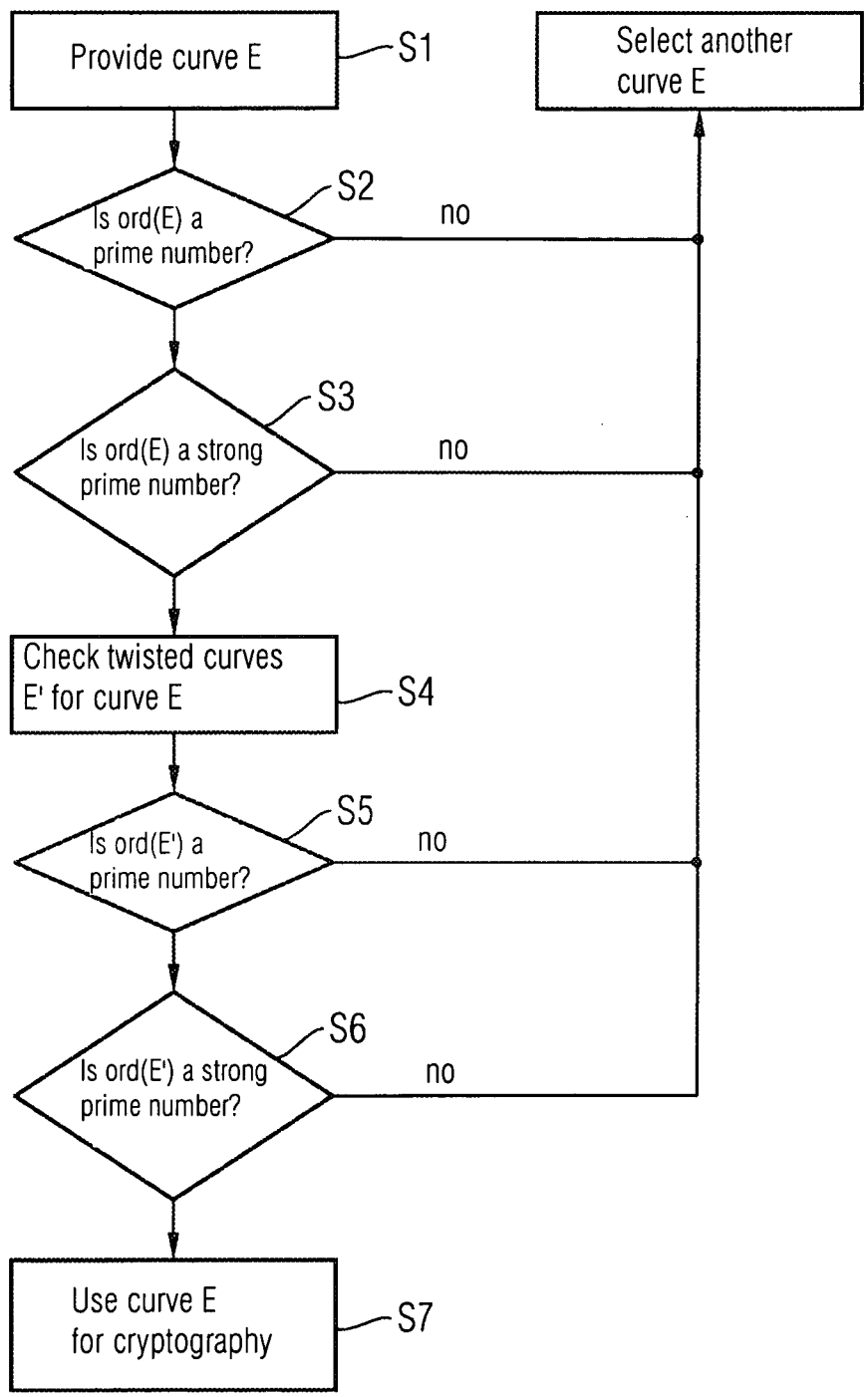
FIG. 1 a flow diagram of one potential embodiment of the proposed method.

Reference will now be made in detail to the preferred embodiments of the present invention, examples of which are illustrated in the accompanying drawings, wherein like reference numerals refer to like elements throughout.

FIG. 1 shows a flow diagram to illustrate one potential embodiment of the proposed method. In a first step, a pool of elliptical curves E is provided (SI). The elliptical curves E are defined over a finite field K. Hence a curve E contains a finite number of points P. As already described, the elliptical curve is defined by the Weierstraβ equation and the parameters $a_1$, $a_2, a_3, a_4, a_6$. Appropriate restrictions on or changes to the parameterization can reduce individual parameters to zero. The parameters are chosen such that the elliptical curves are not singular.

After this, the order of the elliptical curve is determined (S2). The term order of an elliptical curve is to be understood as the number of points in a field K which satisfy the Weierstraβ equation. A geometric interpretation of this is all the points P which lie on the elliptical curve E.

The order of the elliptical curve, abbreviated to ord(E), should be a prime number. If the check shows that it is not a prime number another curve E is selected from the pool (S8). If the order of the elliptical curve E is confirmed as a prime number, a check is then made on whether the order of the elliptical curve is a strong prime number (S3). The definition of a strong prime number is given above.

In the next step (S4) the twisted elliptical curves E for the elliptical curve E are checked. The definition of the twisted curves E' has already been given above. The check is made for all the twisted curves E', i.e. for all possible parameters v which do not correspond to a square or are an element with trace 1. The order of the twisted curves E' are determined individually (S5). The order of the twisted curve E' should also, like the elliptical curve, be a prime number. If this condition is not satisfied, another elliptical curve E is selected.

A check is made in addition as to whether the order of the elliptical curve E' is a strong prime number (E6).

If all the four conditions of steps S2, S3, S5 and S6 are satisfied, the elliptical curve E is selected for a cryptographic method.

The order of an elliptical curve can be determined using a familiar method of enumeration. Alternatively, it is possible to determine the order from the relationship $$\text{ord}(E)+\text{ord}(E')=2|K|+2$$

where |K| is the characteristic of the field K.

Figure 2:
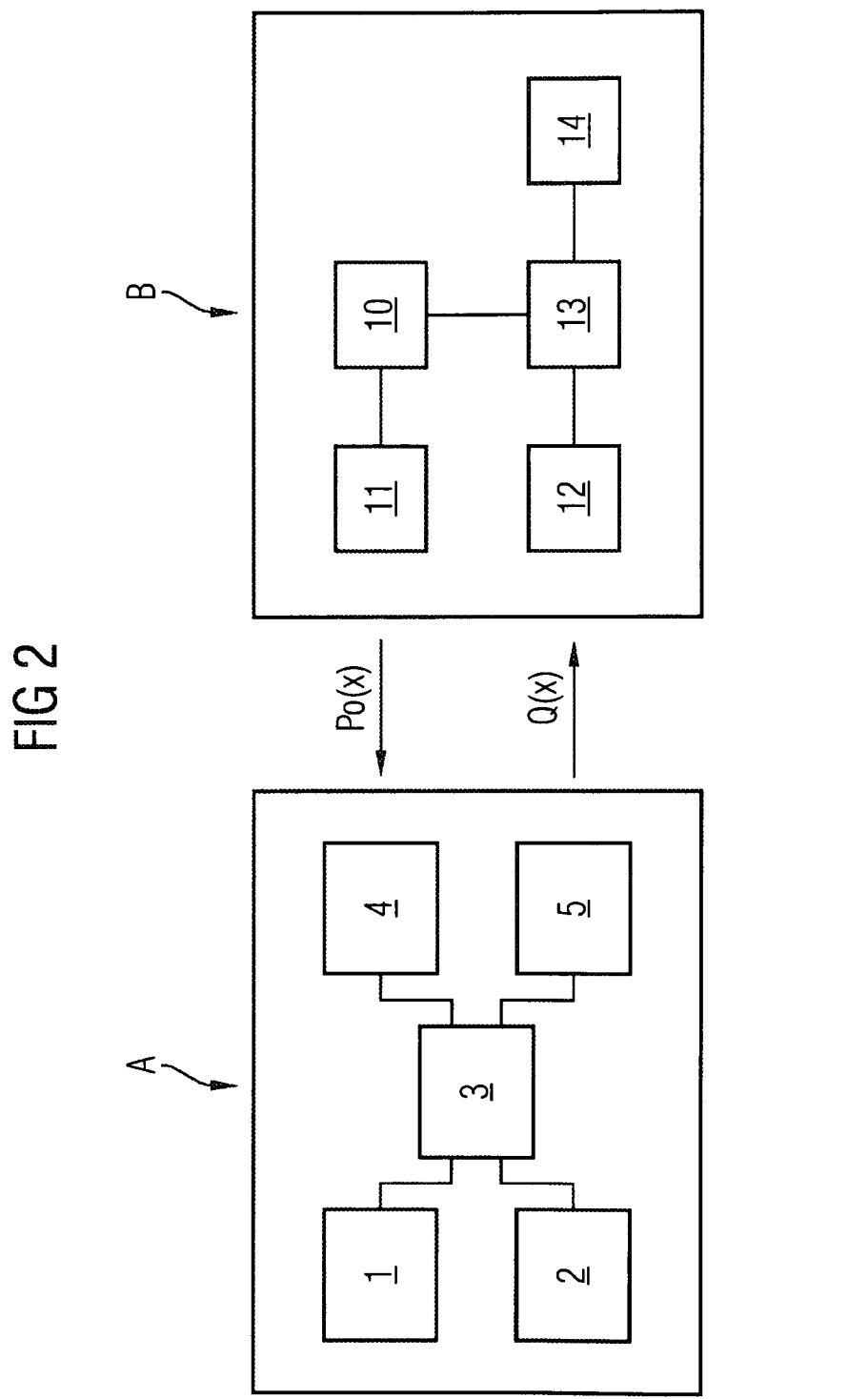
FIG. 2 a block diagram of one potential embodiment of the proposed facility.

FIG. 2 shows a block diagram of a test object A and a testing device B. The test object could be, for example, a smart card or an RFID chip. The testing device B is the appropriate reader. The test object A has a memory device 1, in which is stored a private key KP. This private key KP is kept secret and cannot in any way be read out by an external device. In another memory device 2 are stored the parameters required for parameterizing an elliptical curve E. A data processing device 3 executes an encryption algorithm based on the private key and an elliptical curve, defined by the parameters, which are held in the memory device 2. The parameters or the elliptical curve, as appropriate, are determined using the method, e.g. by the exemplary embodiment shown in FIG. 1. The test object has in addition a receiving device 4, which can receive an x-coordinate of a point. This x-coordinate is fed to the data processing device 3, which executes the previously defined method on it. The special features of this method are that it is applied only to the x-coordinate and also it requires only the x-coordinate of a point. The processed or encrypted x-coordinate is output by a transmission device 5. The test object A does not check on whether the x-coordinate communicated could be a valid x-coordinate. The test object A does not check on whether this x-coordinate is assigned to a point P on the elliptical curve. However, the selected elliptical curves, which are held in the memory device 2, do ensure that it is not possible to spy out or to partially spy out the private key using such an x-coordinate.

The testing device B has a randomizer 10, which selects an arbitrary point PO from the elliptical curve. This is communicated to the test object A by a transmission device 11. The testing device B has in addition a receiving device for receiving the processed x-coordinate Q(x). A data processing device 13 checks the processed x-coordinate using a public key for the test object A. This public key may either be stored in the testing device B, or be obtained from an external source. If the encrypted value corresponds to the x-coordinate previously generated randomly, an output at an interface 14 indicates that the identity of the test object A has been confirmed.

Figure 3:
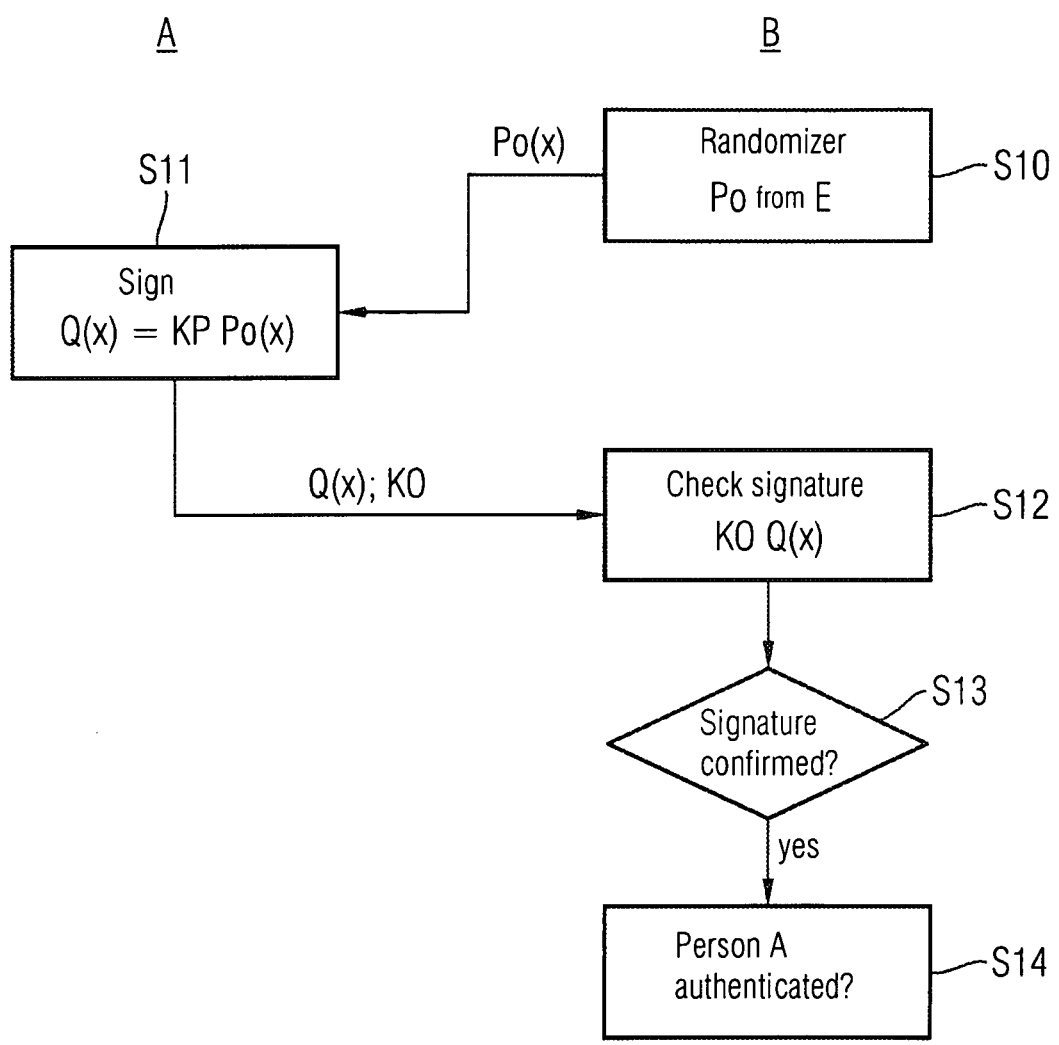
FIG. 3 a flow diagram of one potential embodiment of a method which is executed by the facility shown in FIG. 2.

FIG. 3 shows this sequence of activities for the identification of a test object A, again schematically as a flow diagram. In a first step S10, a randomizer generates a point PO on the elliptical curve E and communicates its x-coordinate to the test object A as a request. This uses its private key KP to calculate a reply from the x-coordinate (S11). Following this, the test object communicates the reply Q(x) and if necessary also its public key KO. The reply is checked by the testing station B by the public key KO (S12). In the event that this confirms the reply, a signal is output to the effect that the person A is authenticated or identified (S13, S14).

A suitable elliptical curve is quoted below by way of example. The finite field K used has the form Z/pZ, and the equation of the elliptical curve E is given by $y^2=x^3+ax+b$. The corresponding parameters of the elliptical curve E are:

$p$=5178479938271606758435496428666610555787617496734405781471

$a$=38341706974568098172697905376562415410863420236739650958

$b$=3953933825845349890476983563304223178976300215672687214876

The order of the elliptical curve, ord(E)= 51784799382716067584354964286666105578761749 6734522943517 and the twisted elliptical curve E' for the elliptical curve E also has a prime order ord(E')= 5178479938271606758435496428666610555787617496734288619427.

The basic point P=(x,y) is given by the coordinates $x$=810944696639150154302550247054691710858315043 04496796756

$y$=482060190644397986573077501327725919378173632606557848976 and lies on the elliptical curve E and in this case does indeed generate a complete group of points. I.e. each point on the elliptical curve E can be represented as a scalar multiple of the basic point P. Further, the orders of the curve E and the twisted curve E' have the following values:

Ord(E)=1+ 4·129461998456790168960887410716665263946904374183630735879

Ord(E')=1+ 2·258923996913580337921774821433330527893808748367144309713

Thus all the characteristics required of an elliptical curve for a cryptographic method are fulfilled.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for cryptographic processing of data, comprising:
   providing an elliptical curve, the elliptical curve having a twisted elliptical curve, which has an order equivalent to a strong prime number P, the strong prime number P being defined by P=1+r·q, where r is a small number in the range up to 255 and q is a large prime number;
   receiving just one x-coordinate of a point;
   providing a private key;
   causing a computer to automatically apply a cryptographic method to the x-coordinate, using the elliptical curve and the private key, to determine a processed x-coordinate; and
   outputting a value based on the processed x-coordinate.

2. The method as claimed in claim 1, wherein providing the elliptical curve comprises:
   providing an elliptical curve to be tested;
   determining an order of a twisted elliptical curve assigned to the elliptical curve to be tested;
   automatically checking whether the order of the twisted elliptical curve is a strong prime number; and
   selecting the elliptical curve to be tested as an elliptical curve which is suitable for cryptographic methods if the order of the twisted elliptical curve is a strong prime number.

3. The method as claimed in claim 2 wherein the order of the twisted elliptical curve is determined by counting how many points lie on the twisted elliptical curve.

4. The method as claimed in claim 2 wherein
the elliptical curve which is to be tested is defined over a field with a known characteristic, and
the order of the twisted elliptical curve is determined based on a determination of the order of the elliptical curve and the characteristic of the field.

5. The method as claimed in claim 2 wherein providing the elliptical curve further comprises:
automatically checking if the order of the elliptical curve to be tested is a strong prime number; and
selecting the elliptical curve to be tested for the cryptographic method only if the order of the elliptical curve to be tested is a strong prime number and the order of the twisted elliptical curve is a strong prime number.

6. The method as claimed in claim 3 wherein
the elliptical curve which is to be tested is defined over a field with a known characteristic.

7. The method as claimed in claim 6 wherein providing the elliptical curve further comprises:
selecting the elliptical curve to be tested for the cryptographic method only if the order of the elliptical curve to be tested is a strong prime number and the order of the twisted elliptical curve is a strong prime number.

8. A method for cryptographic processing of data, comprising:
providing an elliptical curve, the elliptical curve having a twisted elliptical curve, which has an order equivalent to a strong prime number P, the strong prime number P being defined by $P=1+r \cdot q$, where r is a small number in the range up to 255 and q is a large prime number;
transmitting just one x-coordinate of a point to a test object, which applies a cryptographic method to the x-coordinate, using the elliptical curve and a private key, to determine a processed x-coordinate from the x-coordinate communicated;
receiving the processed x-coordinate from the test object;
causing a computer to apply the cryptographic method, using the elliptical curve and a public key, to check the processed x-coordinate for validity; and
confirming identity of the test object if the processed x-coordinate is valid.

9. The method as claimed in claim 8, wherein providing the elliptical curve comprises:
providing an elliptical curve to be tested;
determining an order of a twisted elliptical curve assigned to the elliptical curve to be tested;
automatically checking whether the order of the twisted elliptical curve is a strong prime number; and
selecting the elliptical curve to be tested as an elliptical curve which is suitable for cryptographic methods if the order of the twisted elliptical curve is a strong prime number.

10. The method as claimed in claim 9 wherein the order of the twisted elliptical curve is determined by counting how many points lie on the twisted elliptical curve.

11. The method as claimed in claim 9 wherein
the elliptical curve which is to be tested is defined over a field with a known characteristic, and
the order of the twisted elliptical curve is determined based on a determination of the order of the elliptical curve and the characteristic of the field.

12. The method as claimed in claim 9 wherein providing the elliptical curve further comprises:
automatically checking if the order of the elliptical curve to be tested is a strong prime number; and
selecting the elliptical curve to be tested for the cryptographic method only if the order of the elliptical curve to be tested is a strong prime number and the order of the twisted elliptical curve is a strong prime number.

13. The method as claimed in claim 10 wherein providing the elliptical curve further comprises:
selecting the elliptical curve to be tested for the cryptographic method only if the order of the elliptical curve to be tested is a strong prime number and the order of the twisted elliptical curve is a strong prime number.

14. A method for cryptographic processing of data, comprising:
providing an elliptical curve, the elliptical curve having a twisted elliptical curve, which has an order equivalent to a strong prime number P, the strong prime number P being defined by $P=1+r \cdot q$, where r is a small number in the range up to 255 and q is a large prime number;
transmitting an x-coordinate of a point from a testing station to a test object;
providing a private key by the test object;
causing a computer to determine a processed x-coordinate;
communicating the processed x-coordinate from the test object to the testing station;
providing, by the testing station, a public key for the test object;
checking if the processed x-coordinate is valid, the processed x-coordinate being checked by the testing station, using the public key; and
outputting a confirmation of identity for the test object if the processed x-coordinate is valid, the confirmation being output by the testing station.

15. The method as claimed in claim 14, wherein providing the elliptical curve comprises:
providing an elliptical curve to be tested;
determining an order of a twisted elliptical curve assigned to the elliptical curve to be tested;
automatically checking whether the order of the twisted elliptical curve is a strong prime number; and
selecting the elliptical curve to be tested as an elliptical curve which is suitable for cryptographic methods if the order of the twisted elliptical curve is a strong prime number.

16. The method as claimed in claim 15 wherein the order of the twisted elliptical curve is determined by counting how many points lie on the twisted elliptical curve.

17. The method as claimed in claim 15 wherein providing the elliptical curve further comprises:
selecting the elliptical curve to be tested for the cryptographic method only if the order of the elliptical curve to be tested is a strong prime number and the order of the twisted elliptical curve is a strong prime number.

18. The method as claimed in claim 14 wherein providing the elliptical curve further comprises: selecting the elliptical curve to be tested for the cryptographic method only if the order of the elliptical curve to be tested is a strong prime number and the order of the twisted elliptical curve is a strong prime number.

19. A system to confirm identity of a person or an object, comprising:
a receiver to receive just one coordinate;
a memory to store a private key for the person or the object;
a memory to store parameters of an elliptical curve, the elliptical curve having a twisted elliptical curve, which has an order equivalent to a strong prime number P, the strong prime number P being defined by $P=1+r \cdot q$, where r is a small number in the range up to 255 and q is a large prime number;

a processor to perform a cryptographic method, using the parameters of the elliptical curve and the private key, to process the coordinate received by the receiver and determine a processed x-coordinate; and an output device to output the processed x-coordinate.

20. The method as claimed in claim 1, wherein the large prime number q is a Sophie-Germain prime number and r is 2.

* * * * *